United States Patent [19]

Reighart II

[11] 3,934,844
[45] Jan. 27, 1976

[54] FREE VORTEX AIRCRAFT

[76] Inventor: Ray R. Reighart II, 4778 Hillcrest North, Hilliard, Ohio 43026

[22] Filed: June 10, 1975

[21] Appl. No.: 585,708

[52] U.S. Cl. ............................................. 244/40 A
[51] Int. Cl.[2] ........................................ B64C 23/06
[58] Field of Search .... 244/40 A, 40 R, 12 R, 23 R, 244/42 C, 42 CC, 42 CF, 42 CE

[56] References Cited
UNITED STATES PATENTS

| | | | |
|---|---|---|---|
| 3,480,234 | 11/1969 | Cornish | 244/40 A |
| 3,831,885 | 8/1974 | Kasper | 244/40 A |

*Primary Examiner*—Trygve M. Blix
*Assistant Examiner*—Paul E. Sauberer
*Attorney, Agent, or Firm*—Frease & Bishop

[57] ABSTRACT

An aircraft has air pumping devices which retain, concentrate and augment vorticity shed from a surface of the moving aircraft in such a way as to allow the formation of a lift producing and drag reducing free vortex which travels along with the aircraft (standing vortex), together with a means of supplying thrust for the aircraft. Air flowing past a shield which extends upwardly from the forward edge of a horizontal base causes the shedding of vorticity of one sign into a cavity-like region formed by the shield, base and the housings of a pair of thrusters at the lateral edges of the base. Each thruster includes a cylindrical housing open at both ends through which air is pumped by a power driven propeller, the blades of which rotate in a generally vertical plane, to supply forward thrust for the aircraft. Each housing has an opening to the cavity-like region forward (or up-wind) of the propeller so that air also is pumped from the cavity-like region. This pumping action retains, augments, and concentrates the vorticity and results in the formation of the free vortex stretching transversely across the cavity-like region. The lift producing ability of the free vortex may be further enhanced by an air pumping device, preferably a power driven propeller having an inclined shaft placed centrally in the cavity-like region which augments the free vortex air flow. Alternatively, vorticity shed from a surface of the moving aircraft may be retained, concentrated, and augmented to form a free vortex by a pair of rotating bladed discs which are placed at inclined angles at the edges of the aircraft. The vortex extends from one disc to the other. The forward thrust produced by the pumping action of the rotating discs may be supplemented by powered propellers.

26 Claims, 24 Drawing Figures

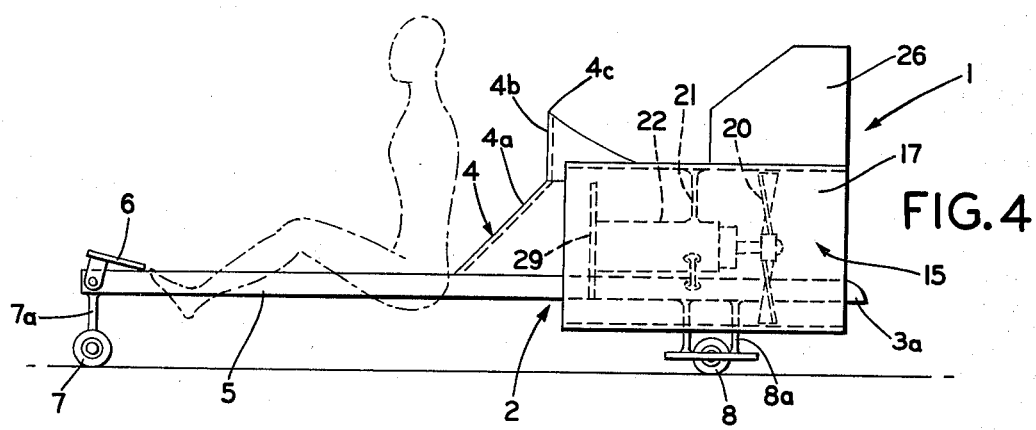
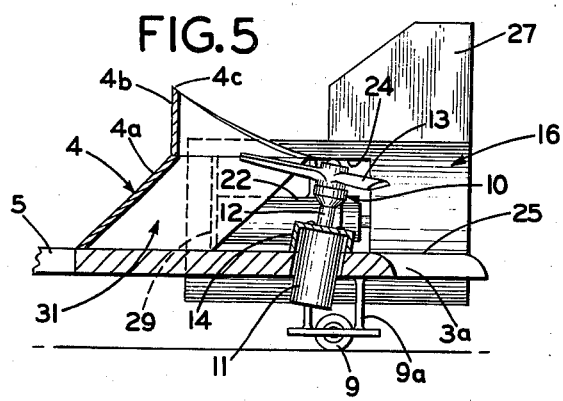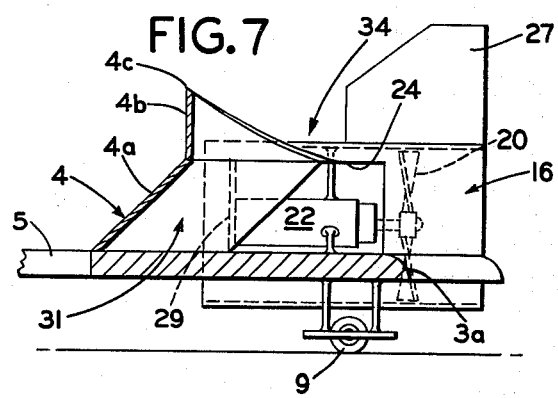
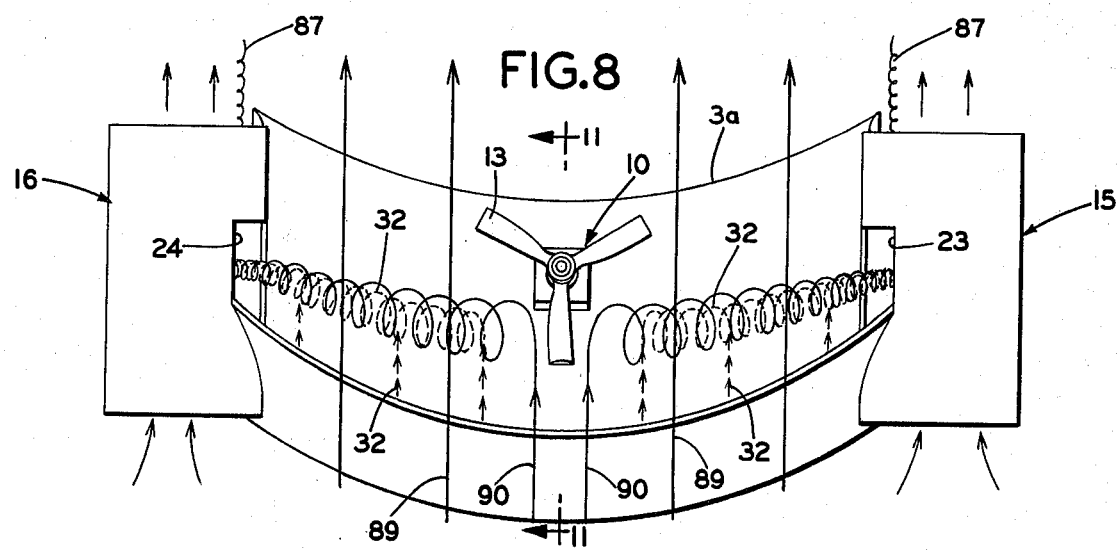
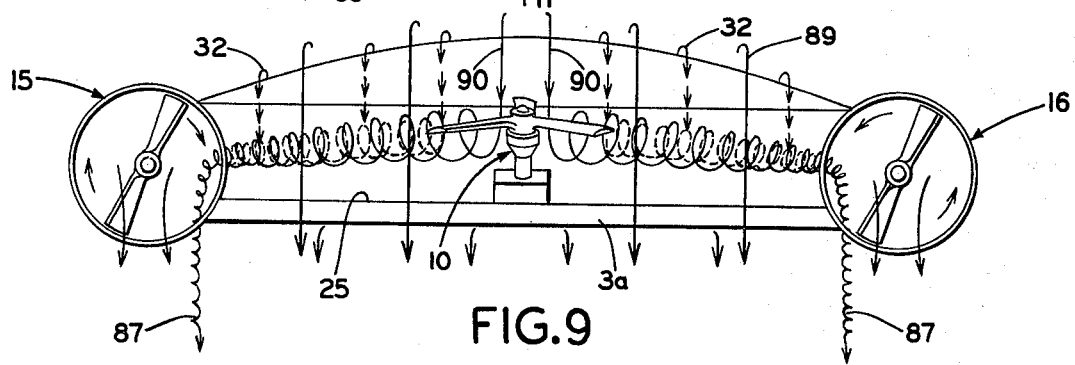

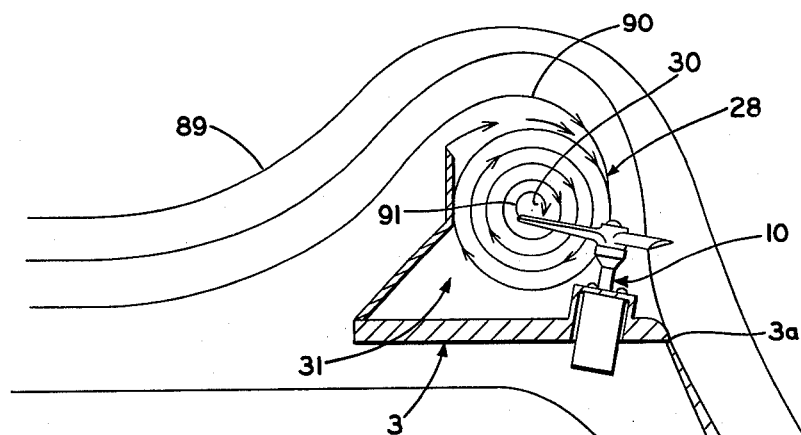
FIG.13
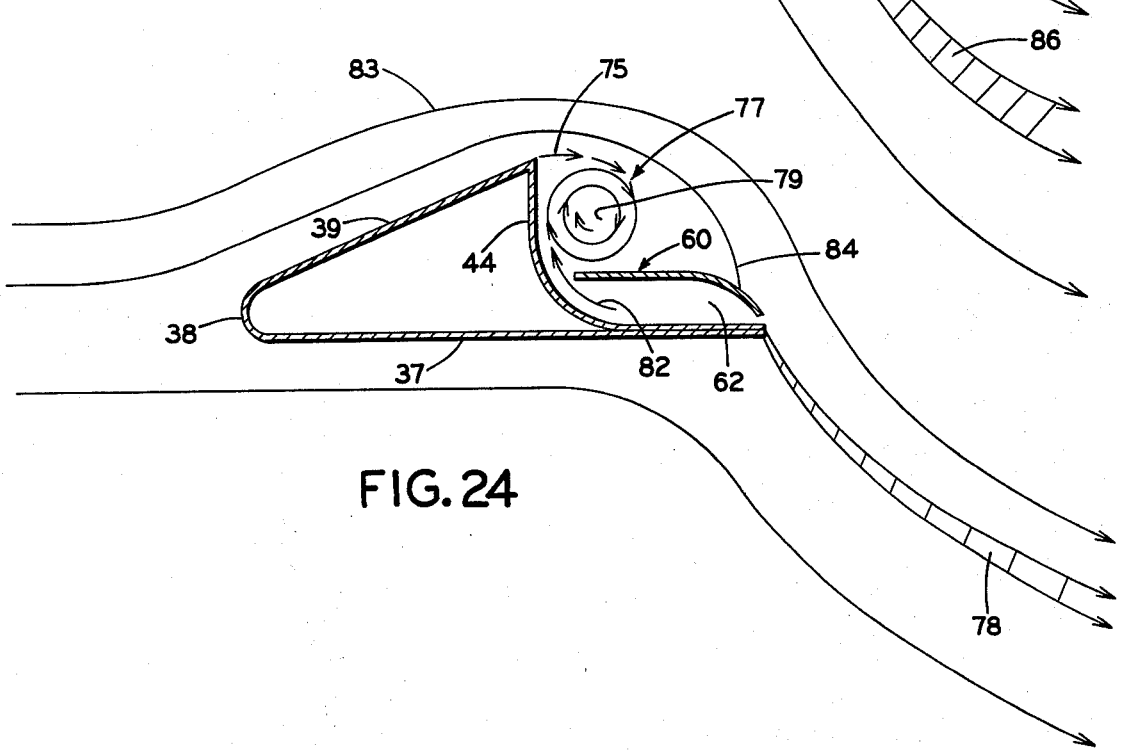
FIG.24
FIG.23
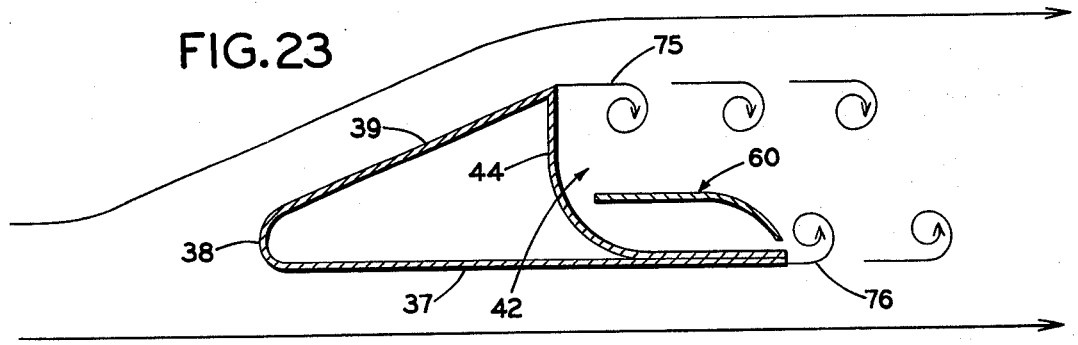

FREE VORTEX AIRCRAFT

BACKGROUND OF THE INVENTION

Field of the Invention

The invention relates to heavier than air aircraft and in particular to aircraft not requiring wings to produce the lift. More particularly, the invention relates to aircraft in which the lift is produced by a free vortex, in combination with forward thrust engines, and in which means are provided to generate, intensify, and stabilize the free vortex.

Description of the Prior Art

There are countless types and styles of aircraft produced and constructed using conventional propeller driven and jet engine driven designs in which the lift is produced on the wings of the aircraft by the movements of the air currents. Likewise, there are various constructions of wingless aircraft usually having a saucer-like shape, such as shown in U.S. Pat. Nos. 1,016,359, 3,051,415, 3,054,578, 3,065,935, 3,394,906, 3,508,360, 3,525,484, 3,568,358 and 3,603,033 in which air currents are produced by a propeller or jet engine, which air currents rotate an annular member or are deflected by a series of baffles and deflector plates downwardly through an open bottom or ducts to provide the lift for the aircraft. Most of these types of aircraft are unsuitable for human occupancy due to the rotation of the frame or a major portion of the aircraft which is necessary to produce the required lift. Therefore, such aircraft have been confined to use as toys.

There also are other styles of aircraft in which a cushion of air is provided beneath the craft to support the craft a short distance above the ground for movement therealong, as shown in U.S. Pat. Nos. 3,101,125, 3,488,882 and 3,653,458.

None of these known types of aircraft use the principle of producing a vortex which in turn creates the lift for the aircraft. One known type of aircraft using vortex generators is shown in U.S. Pat. No. 3,295,608. The vortices created in such a construction, however, must be created in a confined or essentially enclosed space, with a boundary surface above and below the vortex in order to support the aircraft. Such vortices must create an excess pressure under the machine to support it a short distance above the ground, as in ground effect machines. However, such a construction does not generate a free vortex which enables the aircraft to move through the air at great heights without being confined close to the ground.

At low Reynolds numbers a free vortex can be produced above a conventional airfoil as shown in *Fluid Dynamic Drag*, 1965 by Sighard F. Hoerner, pg. 6–13. An airplane which uses this type of vortex to supplement the lift of the wings is described in *Soaring* magazine, Vol. 37, No. 12, Dec. 1973, pgs. 20–23. The vortex, however, is too weak to support an aircraft by itself and disintegrates into turbulence at higher Reynolds numbers.

No aircraft construction of which I am aware, produces lift on the aircraft solely by generation of a free vortex together with means of intensifying and stabilizing the vortex.

SUMMARY OF THE INVENTION

Objectives of the invention include providing an aircraft having surfaces with relatively sharp edges which may be stationary or moving with respect to the frame of the aircraft from which a substantial amount of vorticity of one sign is shed even at low air speeds; providing an aircraft having an upwardly extending shield on the forward edge of a horizontal base so that a horizontal air flow will cause vorticity of one sign to be shed into a region over the horizontal base where it will be retained, concentrated, and intensified by pumping devices, while varticity of the opposite sign is shed from the downwind edge of the base and is not captured; providing an aircraft having air pumping devices which retain, concentrate, and intensify diffuse vorticity into a strong free vortex above the frame of the aircraft, which in turn, produces lift for the aircraft; providing an aircraft having a pair of spaced vortex generators mounted on angles with respect to the horizontal which produce a free vortex extending in a general arcuate manner between the spaced generators, and in which the spaced generators intensify the vortex by pumping air both into and out of the region where the vortex forms; providing an aircraft in which the air pumping devices which retain, concentrate, and intensify diffuse vorticity into a strong free vortex by pumping air from the region where the vortex forms, also produce the forward thrust on the aircraft; providing an aircraft in which the intensity of a free vortex is augmented by means of a power driven propeller positioned near the vortex; providing an aircraft having air pumping devices which retain vorticity shed from a surface or surfaces which otherwise would have a large turbulent wake and a correspondingly large pressure drag, thus decreasing the size of the wake and the magnitude of the drag; providing an aircraft having a non-rotating frame thereby being suitable for human occupancy and use; providing an aircraft which can have various exterior configurations to provide the desired stability and maneuverability thereto, and which can be of a relatively simple and inexpensive construction yet provide the desired lift and thrust needed for the operation thereof; providing an aircraft having a high lift at low airspeeds making it possible to take off and land from a short runway; providing an aircraft having a compact size and thus being easily stored; providing an aircraft having a vorticity shedding shield member with a curved upper edge which conforms closely to the natural shape of the free vortex and leads to a more stable free vortex; and providing an aircraft having a transverse space between the free vortex and the downwind side of the shield from which air can be withdrawn and in that way hold the free vortex tightly onto the aircraft.

These objectives and advantages are obtained by the free vortex aircraft, the general nature of which may be stated as including frame means; shield means mounted on the frame means to generate and shed a substantial amount of vorticity into the air when the aircraft moves forwardly through the air; the shield means and frame means providing a vortex forming zone downwind of the shield means; a plurality of engine means mounted on the frame means to provide thrust for moving the aircraft forwardly through the air, and for pumping air from the vortex forming zonee to retain and concentrate the vorticity within said zone to form a free vortex of low pressure air extending in an arcuate manner across the frame means; surface means on the frame means located beneath at least a portion of the formed free vortex, on which the free vortex acts to produce lift on said aircraft; the engine means including a pair of open-ended cylindrical housings mounted on the frame means adjacent the ends of the formed free vortex, with propeller means being mounted within the cylindrical housings; the shield means having a vertically extending shield member terminating in a top sharp edge, said shield member extending transversely across the frame means between the cylindrical housings; the frame means further including a generally flat horizontal base extending rearwardly or downwind from the vertical shield member; opening means formed in the cylindrical housings communicate with the vortex forming zone, through which opening means air is pumped from the core of the vortex by the propeller means; and vortex augmentor means mounted on the base between the cylindrical housings and rearwardly of the vortex forming zone to increase the airflow into the vortex. Alternately, the engine means may include a pair of inclined spaced discs having blades mounted thereon with the free vortex extending in an arcuate manner between the discs, with the discs providing a portion of the surface on which the vortex acts to produce the lift on the aircraft.

BRIEF DESCRIPTION OF THE DRAWINGS

Preferred embodiments of the invention — illustrative of the best mode in which applicant has contemplated applying the principles — are set forth in the following description and shown in the drawings and are particularly and distinctly pointed out and set forth in the appended claims.

FIG. 4 is a side elevational view looking in the direction of Arrows 4—4, FIG. 1;

FIG. 5 is a sectional view taken on line 5—5, FIG. 1;

FIG. 7 is a fragmentary sectional view taken on line 7—7, FIG. 6;

FIG. 8 is a fragmentary diagrammatic view similar to FIG. 1 showing the generation of the free vortex;

FIG. 9 is a fragmentary diagrammatic view similar to FIG. 3 showing an elevational view of the free vortex of FIG. 8;

FIG. 13 is a fragmentary diagrammatic sectional view similar to FIG. 12 showing the airflow and vortex formed with the vortex augmentor being used;

FIG. 23 is a fragmentary diagrammatic sectional view of the air flow taken on line 23—23, FIG. 21 before the vortex has formed; and FIG. 24 is a fragmentary diagrammatic sectional view similar to FIG. 23 showing the air flow and generated vortex.

Similar numerals refer to similar parts throughout the drawings.

DESCRIPTION OF THE PREFERRED EMBODIMENTS

First Embodiment

Figure 1:
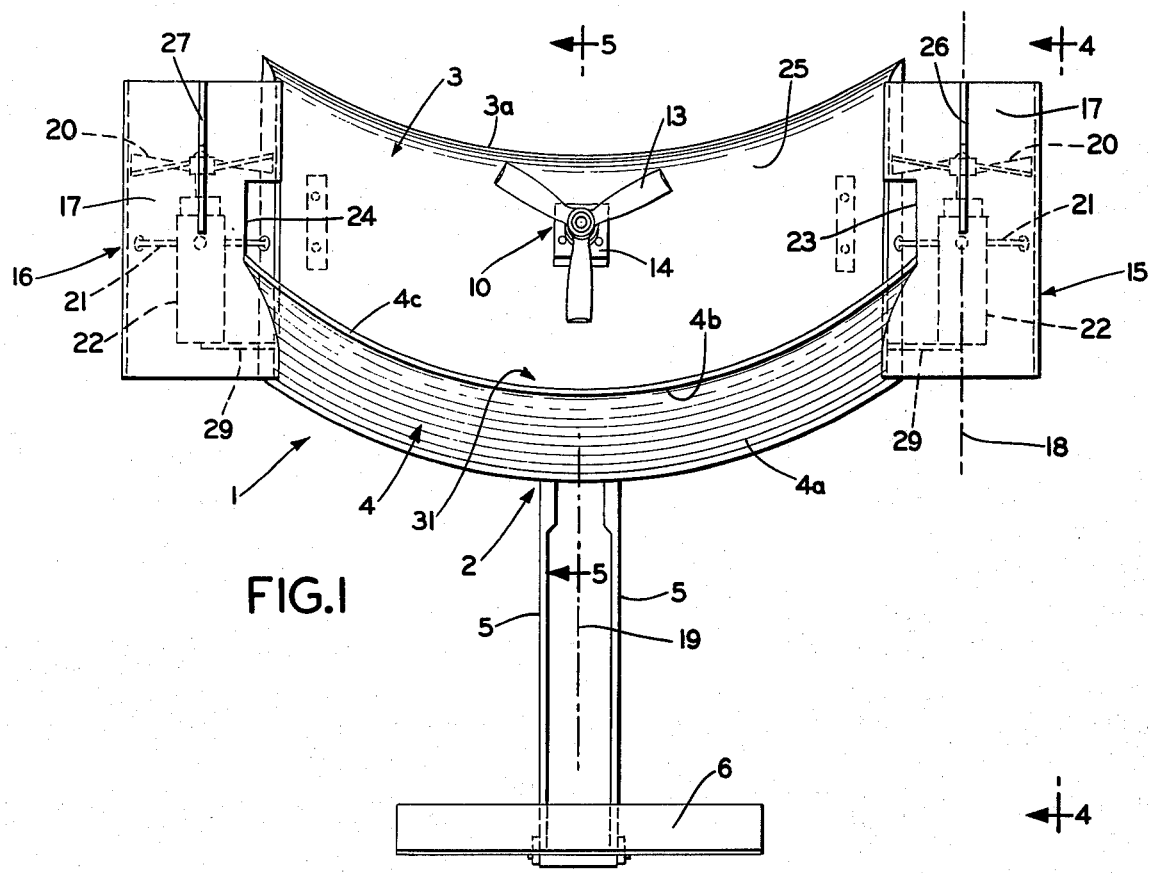
FIG. 1 is a top plan view showing the first embodiment of the improved aircraft construction.
Figure 2:
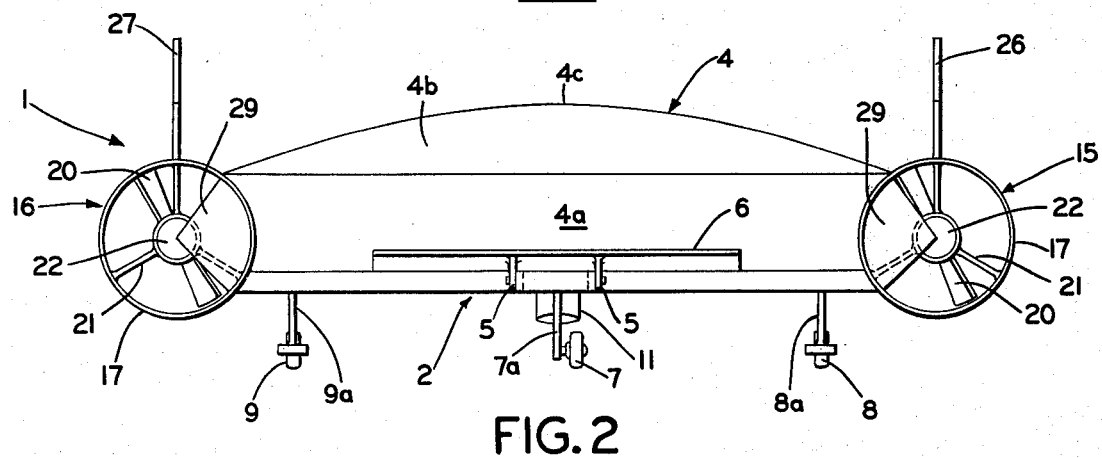
FIG. 2 is a front elevation of the aircraft shown in FIG. 1.
Figure 3:
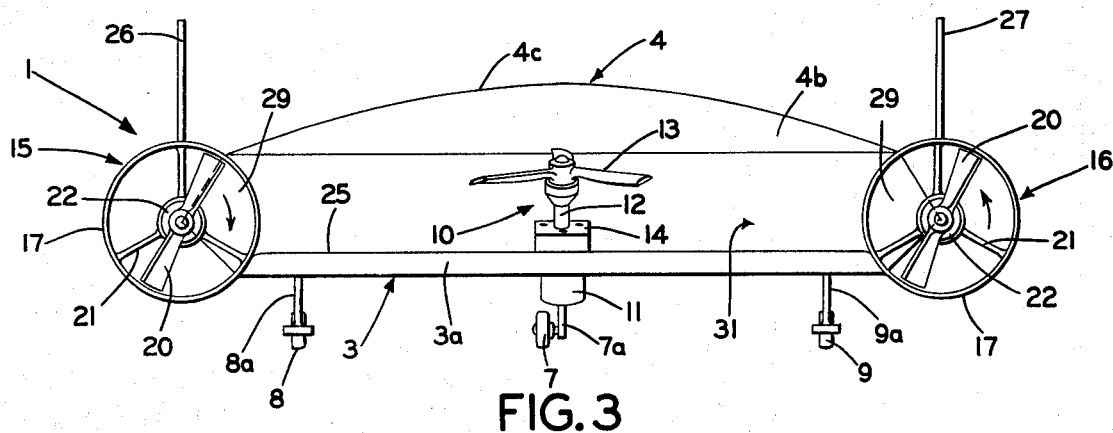
FIG. 3 is a rear elevation of the aircraft shown in FIGS. 1 and 2.

The preferred construction of the aircraft of the invention is indicated generally at 1, and is shown particularly in FIGS. 1, 2 and 3. Aircraft 1 includes a frame 2, a base 3 and a shield 4. Base 3 is a flat, horizontal, arcuate-shaped member with a relatively sharp trailing edge 3a. Shield 4 includes a rearwardly curved, rearwardly sloping shield member 4a having a vertically extending, arcuate-shaped upper section 4b with a relatively sharp top edge 4c (FIG. 4). Shield 4 extends along the forward or upwind end of base 3.

A pair of spaced horizontally extending members 5 are mounted on base 3 and extend forwardly from base 3 and shield 4 to provide a supporting structure for a pilot, shown diagrammatically in dot-dash lines, FIG. 4. A front control surface 6 is pivotally mounted on the forward end of members 5.

A wheel 7 is rotatably mounted on a front wheel support member 7a which extends downwardly from the forward ends of members 5 to support the front portion of aircraft 1 when the aircraft is not in flight. A pair of wheels 8 and 9 are rotatably mounted on support members 8a and 9a, respectively, which extend downwardly from the bottom of base 3 for supporting the rear portion of aircraft 1. Various other styles and arrangements of frame members 5, control surface 6, and support wheels 7, 8 and 9 may be employed and used in the construction of aircraft 1 without departing from the concept of the invention. Also, other control and stabilizing surfaces than those illustrated may be needed to insure a stable and controlled flight, but form no part of the invention.

A vortex augmentor, indicated generally at 10 is mounted centrally on base 3. Augmentor 10 is shown in the drawings as an engine driven propeller arrangement having an engine 11 (FIG. 5) which rotates a shaft 12 and a propeller 13. Engine 11 may be supported on base 3 by a U-shaped mounting bracket 14. Shaft 12 extends in a generally vertical direction, and preferably is inclined at a slight angle, as shown in FIG. 5, the purpose of which is discussed below.

Thruster assemblies, indicated generally at 15 and 16, are mounted on the ends of base 3. Assemblies 15 and 16 are similar in construction and operation, thus only assembly 15 is discussed in detail. Assembly 15 includes a cylindrical housing 17 with its longitudinal axis 18 extending generally parallel to the longitudinal axis 19 of frame 2. A propeller 20 is mounted within cylinder 17 by supporting brackets 21 and is rotatably driven by an engine 22 in order to thrust air towards the rear. The propeller of assembly 16 also must thrust air toward the rear when rotated.

Openings 23 and 24 (FIGS. 1, 5 and 7) are formed in cylinders 17 of thruster assemblies 15 and 16, respectively, adjacent top surface 25 of base 3 at the forward end thereof adjacent shield 4. Fins 26 and 27 also may be mounted on top of cylinders 17 and extend upwardly therefrom to provide additional stabilizing and (if movable) maneuvering means for aircraft 1. Fins 26–27 and cylinders 17 act as "flow fences" and allow a stronger vortex to be created by preventing air from entering the vortex region 31 from the sides of the aircraft.

Inside each thruster cylinder 17, just forward (upwind) of openings 23 and 24 a partial choke 29 is placed (FIG. 2), the purpose of which is to increase the rate at which air is pumped by the thrusters through the openings 23 and 24 from region 31 where the vortex forms by blocking a portion of the airflow through the front of the housing. Region 31 is defined by the rear portion of shield 4 and the housings of thruster assemblies 15 and 16.

Figure 6:
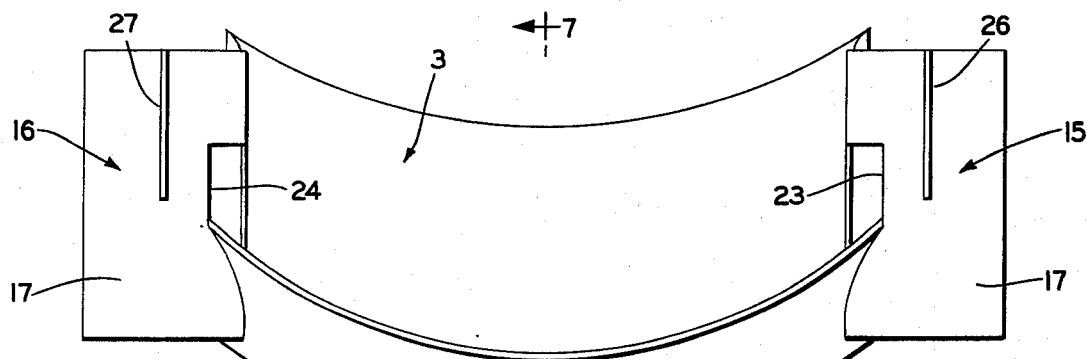
FIG. 6 is a fragmentary top plan view of a modified form of the aircraft construction shown in FIG. 1, with the vortex augmentor removed.

Vortex augmentor 10 need not be used in aircraft 1 for satisfactory operation thereof, but can be omitted as shown in a slightly modified aircraft construction indicated generally at 34, and shown in FIGS. 6 and 7. Vortex augmentor 10 merely increases the strength of the vortex being produced. Aircraft 34 is similar to aircraft 1 except for removal of vortex augmentor 10 and thus, need not be described in detail.

Figure 10:
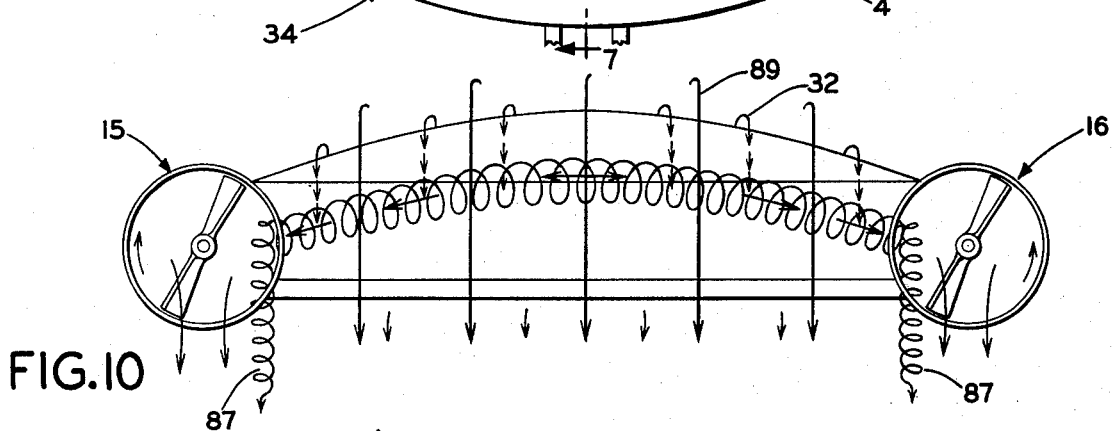
FIG. 10 is a fragmentary diagrammatic view similar to FIG. 9 showing the generation of the free vortex for the aircraft construction shown in FIG. 6.
Figure 11:
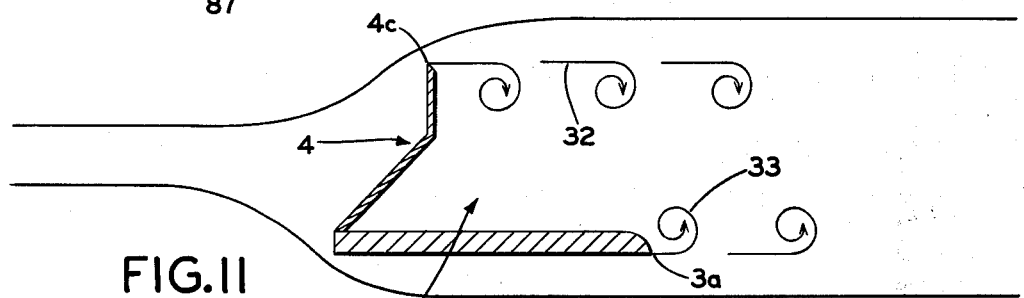
FIG. 11 is a fragmentary diagrammatic sectional view taken on line 11—11, FIG. 8 showing the airflow before the vortex has formed and with the vortex augmentor removed.
Figure 12:
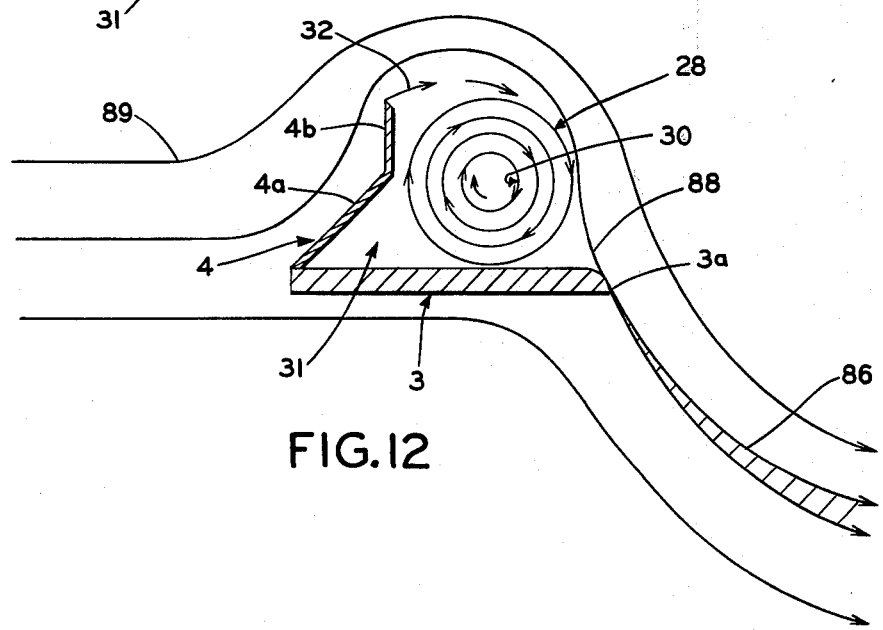
FIG. 12 is a fragmentary diagrammatic sectional view similar to FIG. 11 showing the airflow after the vortex has formed, and with the vortex augmentor removed.
Figure 14:
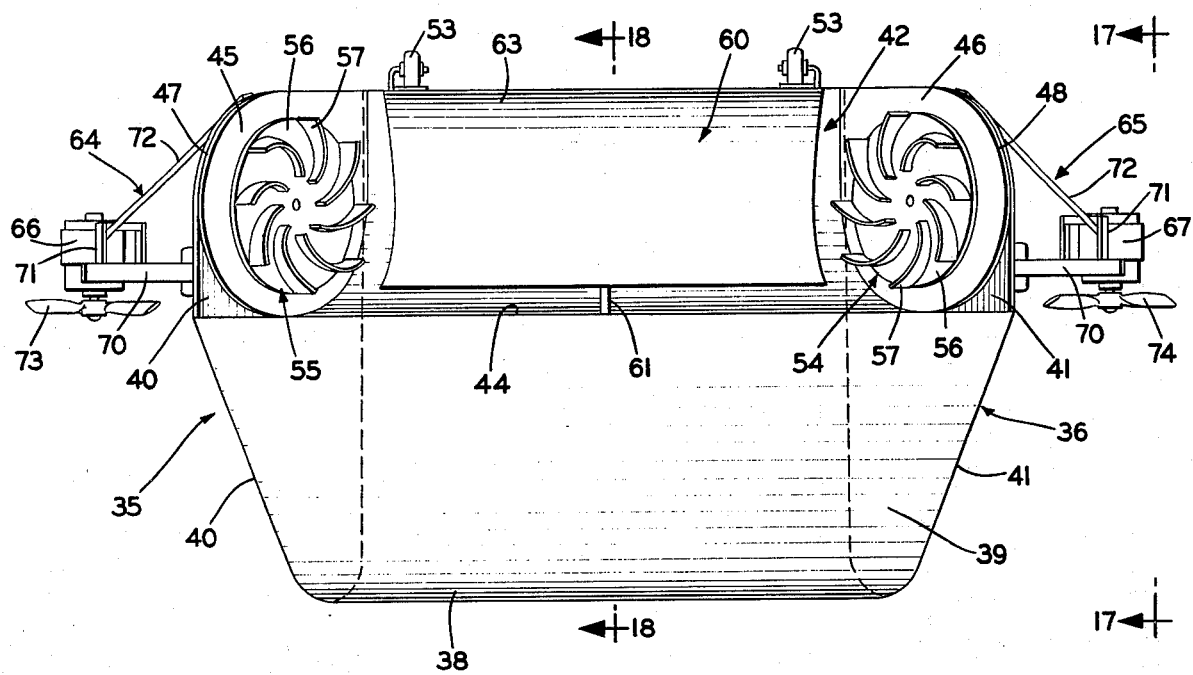
FIG. 14 is a top plan view showing a second embodiment of the free vortex aircraft.
Figure 15:
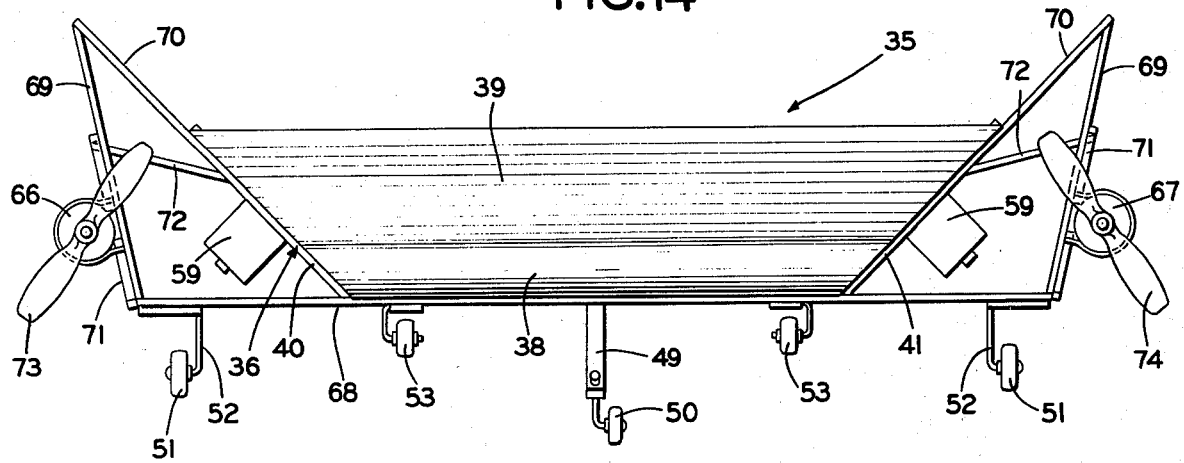
FIG. 15 is a front elevational view of the aircraft shown in FIG. 14.
Figure 16:
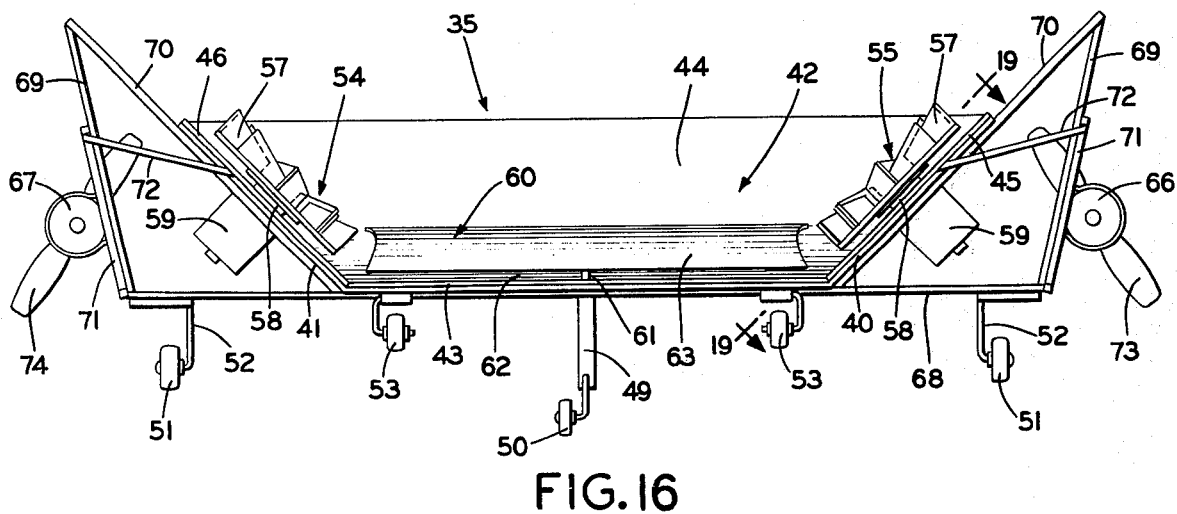
FIG. 16 is a rear elevational view of the aircraft shown in FIGS. 14 and 15.
Figure 17:
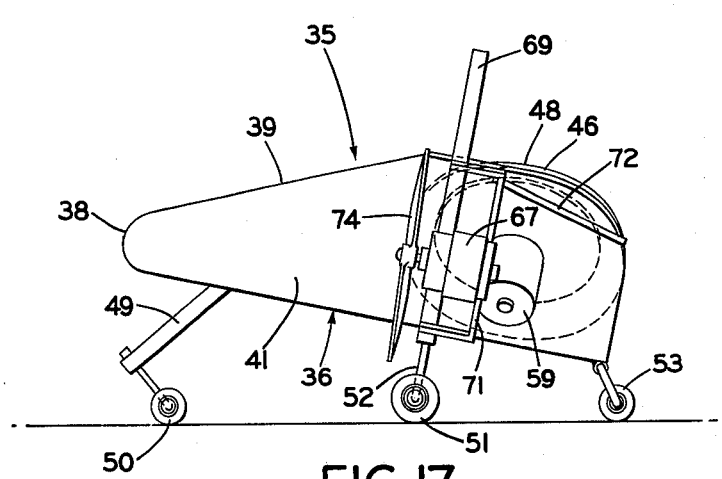
FIG. 17 is an end elevation looking in the direction of Arrows 17—17, FIG. 14, with the aircraft being shown in at-rest position with the front end elevated.
Figure 19:
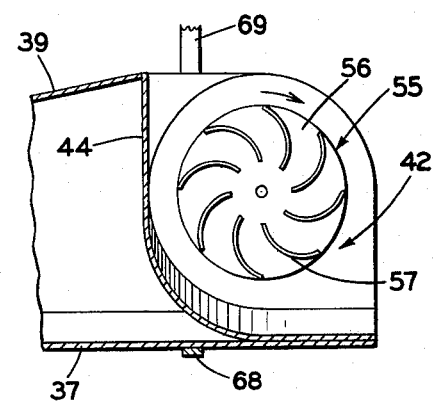
FIG. 19 is a fragmentary sectional view taken on line 19—19, FIG. 16.

First consider the operation of the aircraft without the vortex augmentor 10, as shown diagrammatically in FIG. 11. When the aircraft moves through the air, vorticity 32 of one sign (assume positive) is shed from the relatively sharp edge 4c at the top of shield 4 past the vortex region 31, while a corresponding amount of vorticity 33 of negative sign is shed from the relatively sharp trailing edge of base 3a. The positive vorticity 32 is retained and concentrated onto a strong, lift producing vortex 28 (FIG. 12) by the vortex stretching action of the pumping of the air from the vortex region 31 through the openings 23 and 24 in the thrusters 17. The negative vorticity 33 is washed downstream in the wake 86. Air pumped from the vortex region is expelled downstream from the thrusters 15 and 16 and forms the trailing vortices 87 (FIGS. 9 and 10). There also is reattachment of a streamline 88 (FIG. 12) near the trailing edge 3a of the base 3. This results in a small wake 86 and thus, there is very little pressure drag. Outside air 89 is deflected by the low pressure region above the vortex and the reaction to this gives the lift on the aircraft.

The vortex 28 forms just downwind of the arcuate-shaped upper section 4b of the shield 4. As the speed of the aircraft is increased the rate at which air is pumped from the vortex region 31 may have to be increased in order to prevent the vortex from blowing off the aircraft. The reason for the rearwardly sloping shield member 4a is to enlarge the vortex region 31 upwind of the vortex (between the vortex and the downwind side of the shield), creating a space from which air is withdrawn to hold the vortex more tightly onto the aircraft. By using the thrusters 15 and 16 to pump air from the vortex region 31 as well as to supply forward thrust to the aircraft, these two functions may be correlated automatically to prevent the vortex from blowing off the aircraft up to the maximum speed of the aircraft.

The strength of the vortex may be increased by a vortex augmentor 10 (FIGS. 1, 3, 5 and 13). The vortex augmentor is mounted centrally on the base 3 and tilted so that it will thrust in the direction of the vortex airflow and increase the velocity of the air circulating around the vortex core 30. It also draws air into the vortex which ordinarily would not go into the vortex (e.g., streamline 90, FIGS. 9 and 13) and sheds vorticity 91 into the core, from the boundary layer of the propeller, where it increases the strength of the vortex 28.

Second Embodiment

A modified form of the improved aircraft construction which generates a free vortex to produce the lift therefor, is indicated generally at 35, and is shown in FIGS. 14–18. Aircraft 35 includes an outer frame 36 having a flat bottom wall 37 (FIG. 18) which terminates in a rounded front end or nose 38. A smooth top wall 39 extends upwardly rearwardly from rounded nose 38 and terminates generally intermediate the front and rear of the aircraft.

Downwardly, inclined side walls 40 and 41 (FIG. 15) extend between bottom and top walls 37 and 39 and enclose the front or nose section of aircraft 35. Side walls 40 and 41 extend throughout the length of bottom wall 37 beyond top wall 39 and form a free vortex generating area, indicated generally at 42, adjacent the rear portion of the aircraft. Area 42 is defined by the rear portions of side walls 40 and 41 and the rear portion of bottom wall 37 and the rear portion of shield 44.

A reinforcing base 43 (FIGS. 16 and 18) may be mounted on the rear portion of bottom wall 37 within the vortex area 42, and terminates in an upwardly, concavely curved forward shield wall 44. Shield wall 44 also forms the rear wall of the aircraft nose section. Side wall reinforcing members 45 and 46 (FIGS. 14 and 18) may be mounted on the rear portions of side walls 40 and 41, and are formed with circular top edges 47 and 48, respectively.

A front wheel support member 49 is mounted on and extends downwardly from bottom wall 37 with a wheel 50 rotatably mounted thereon. A pair of intermediate wheels 51 also are mounted on the ends of support members 52 which extend downwardly from aircraft frame 36. Wheels 51 together with a pair of rear wheels 53 and front wheel 50 form the means for supporting aircraft 35 when not in flight, and permit movement of the aircraft along the ground during take-off and landing procedures.

In accordance with the invention, a pair of vortex generators indicated at 54 and 55 are mounted on side wall reinforcing members 46 and 45, respectively. Generators 54 and 55 are similar and each includes a circular disc 56 having a plurality of generally radially extending curved blades 57 mounted on the top surface of disc 56. Discs 56 are rotatably supported on side wall 40 and 41 by bearings 58 (FIG. 16) and are rotatably driven in opposite directions (generator 54-counterclockwise, and generator 55-clockwise, when viewed from above as in FIG. 14) by engines 59.

Figure 18:
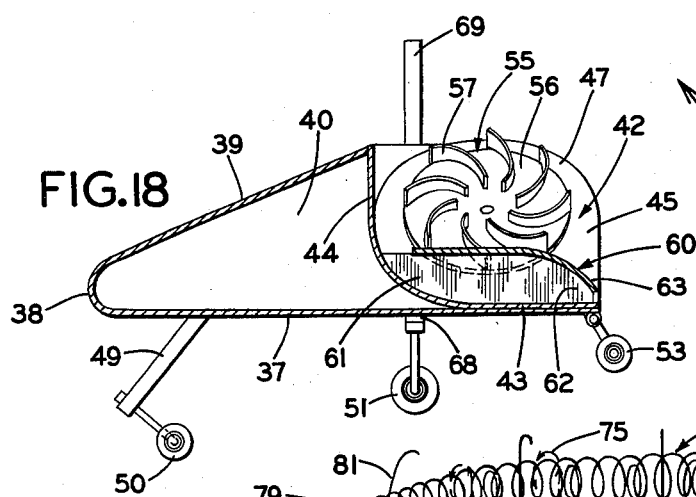
FIG. 18 is a sectional view taken on line 18-18, FIG. 14.

A baffle plate 60 is mounted on bottom wall reinforcing base 43 and is spaced above base 43 by a longitudinally extending baffle support brace 61. Baffle 60 forms an air passage 62 open at both ends and sides between the top surface of base 43 and the bottom surface of baffle 60 (FIG. 18). Baffle 60 preferably has a downwardly curved rear end section 63 which helps to reduce drag on the aircraft during flight.

A pair of outrigger brace assemblies, indicated generally at 64 and 65 are mounted on and extend outwardly from side walls 40 and 41, respectively, for supporting thrust engines 66 and 67 mounted thereon. Outrigger assemblies 64 and 65 are similar and include a main support beam 68 which extends transversely across aircraft frame 36 and is mounted on the bottom surface of bottom wall 37. Intermediate wheels 51 preferably are mounted on beam 68.

A pair of braces 69 extend generally vertically upwardly from the ends of beam 68, and are connected to side walls 40 and 41 by diagonal braces 70. Thrust engines 66 and 67 are mounted on braces 69 by support brackets 71 (FIG. 17) which are attached by struts 72 to walls 40 and 41. Propellers 73 and 74 are rotatably mounted on and are driven by thrust engines 66 and 67, respectively, to produce the forward thrust for aircraft 35. Engines 66 and 67, as well as engines 59, may be usual internal combustion gas driven engines, electric motors, jet engines or the like.

Various styles and arrangements of control and stabilizing surfaces may be employed and used in the construction of aircraft 35 without departing from the concept of the invention.

Operation of aircraft 35 is similar to the operation of aircraft 1 described above in that a free vortex is produced which provides the lift for the aircraft. Aircraft 35 differs somewhat from aircraft 1 in the way the three features – thrust production, pumping air from the region where the vortex forms, and vortex augmentation – are combined. In aircraft 1, thrust production and pumping air from the region where the vortex forms are combined into one process, performed by the thrusters 15 and 16, while vortex augmentation, when used, is a separate process, performed by the vortex augmentor 10. In aircraft 35, pumping air from the region where the vortex forms and vortex augmentation are combined into one process, performed by the vortex generators 54 and 55 while generation of most of the thrust is a separate process, performed by the propellers 73 and 74.

FIGS. 20–24 show diagrammatically the manner of producing the free vortex and the resulting lift for the aircraft 35. As the aircraft moves through the air, vorticity 75 (assume positive) similar to vorticity 32 of aircraft 1, is shed from the downwind edge of the top wall 39 into the vortex region 42. A corresponding amount of negative vorticity 76 is shed from the trailing edge of the aircraft (FIG. 23) as described above for vorticity 32 and 33 of aircraft 1. The positive vorticity 75 is retained and concentrated into a strong free vortex 77 similar to vortex 28 (FIG. 24) in the vortex region 42 by the pumping action of the vortex generators 54 and 55 (which resemble centrifugal pumps in their operation) while the corresponding negative vorticity 76 is washed away in the wake 78.

Figure 22:
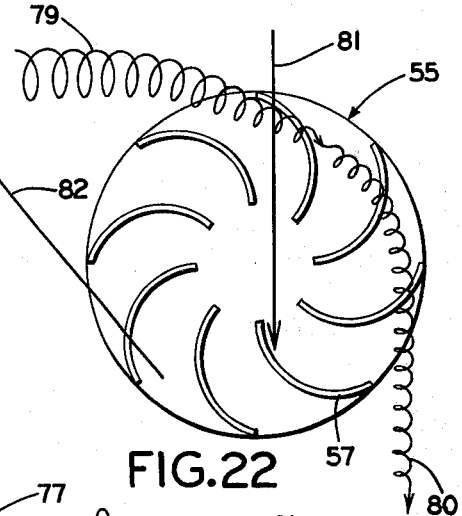
FIG. 22 is an enlarged diagrammatic view showing one of the vortex generators and the associated airflow producing the free vortex for the embodiment shown in FIGS. 14–21.
Figure 20:
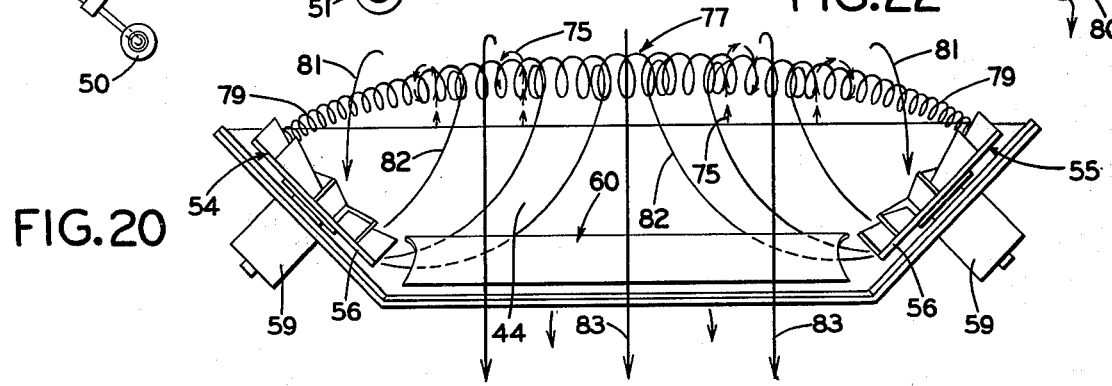
FIG. 20 is a general diagrammatic rear elevational view similar to FIG. 16 showing the generated free vortex.
Figure 21:
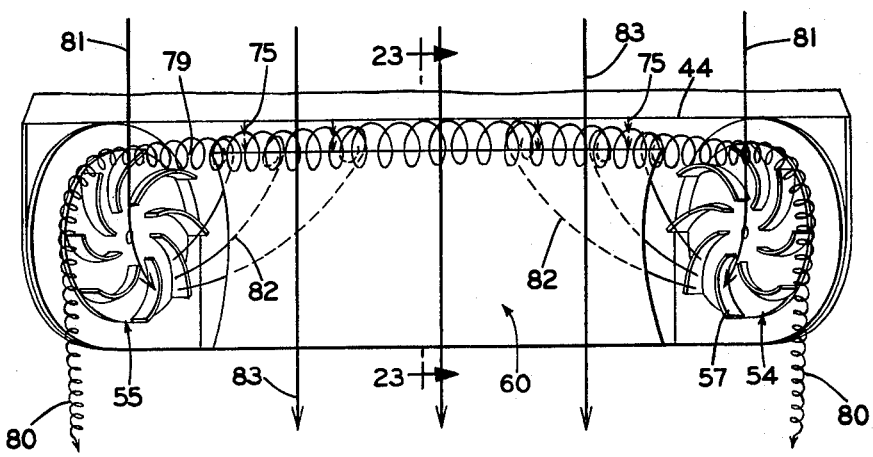
FIG. 21 is a fragmentary diagrammatic top plan view similar to FIG. 14 showing generation of the free vortex.

When observed by means of smoke introduced into the region 42 where the vortex forms, the vortex core 79 appears to touch down on the upwind half of each vortex generator, where air is pumped from it and its surroundings and thrown downstream to form the trailing vortices 80, as shown in FIG. 22 for vortex generator 55. The thrown off air generates some forward thrust. At the same time the vortex is augmented by outside air 81 (FIGS. 20 and 21) which enters the vortex generator on its downward half and is thrown generally upwind 82 through the air passage 62 and into the vortex. The airflow about the aircraft 35 (FIG. 24) is generally the same as the airflow about aircraft 1. A streamline 84 attached to the rear of the aircraft 35 insures a relatively small pressure drag. Lift results from the deflection of additional outside air 83 by the low pressure region above the vortex.

IN GENERAL

Four important features are required to generate the lifting free vortex for the operation of aircraft 1 and 35 shown in the drawings and described above.

First, means are required to set the aircraft into forward motion as done by the thrusters 15 and 16 of aircraft 1 and the thrust engines 66 and 67 of aircraft 35.

Second, means are required to use the forward motion of the aircraft to generate and shed a substantial amount of vorticity into the air. This is accomplished in aircraft 1 by the shield 4 and in aircraft 35 by the top wall 39 of the front of the aircraft and the top of the shield 44.

Third, means are required to pump air from spaced locations downwind of the vorticity shedding means in order to retain and concentrate the vorticity into a strong free vortex of low pressure air extending in an arcuate manner between the pumping locations. This is accomplished in aircraft 1 by the thrusters 15 and 16 which pump air through the holes 23 and 24, and in aircraft 35 by the vortex generators 54 and 55.

Fourth, means are required to transfer the lift force generated by the free vortex to the aircraft. The lift force manifests itself as a lowering of the air pressure above any surface beneath the vortex. The pressure is especially low where the vortex core closely approaches a surface. In aircraft 1, the entire top surface 25 of base 3 has low pressure above it, especially near the holes 23 and 24 where the vortex core is closest to the surface. In aircraft 35, the vortex extends between the vortex generators 54 and 55 (FIG. 20) so that the pressure is lowest above the circular discs 56 of the vortex generators. The pressure is low above the baffle plate 60.

The strength of a vortex, hence its lifting ability, can be increased by means which increase the vorticity contained in the vortex. In aircraft 1, the vortex augmentor 10 pumps air with vorticity 91 into the vortex, and in aircraft 35, the vortex generators 54 and 55 pump air with vorticity 82 into the vortex, increasing the strength of the vortex in both cases.

Furthermore, as aircraft 1 and 35 move forwardly, the air above them, indicated at 89 and 83, respectively, is deflected downwardly by the vortex, which downward movement of air is the ultimate source of the lift force. Likewise, the small pressure drag of aircrafts 1 and 35 is due to the reattachment of the streamlines 88 and 84 near the trailing edges of the aircraft which results in the small wakes 86 and 78.

Accordingly, the free vortex aircraft construction provides a wingless aircraft which can have various simple external configurations, and in which the frame is non-rotating thereby being suitable for human occupancy; which provides an aircraft which uses the principle of a free vortex to provide the lift for the aircraft, with means being provided for pumping air from the core of the vortex to increase the strength thereof and the resulting lift, and in which the vortex pumping means also can supply simultaneously the forward thrust to the aircraft; and provides such a construction which is effective, safe, inexpensive, and efficient in assembly, operation and use, and which achieves all the enumerated objectives, provides for eliminating difficulties encountered with prior devices, and solves problems and obtains new results in the art.

In the foregoing description, certain terms have been used for brevity, clearness and understanding but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details of the construction shown or described.

Having now described the features, discoveries and principles of the invention, the manner in which the improved free vortex aircraft is constructed, assembled and operated, the characteristics of the new construction, and the advantageous, new and useful results obtained; the new and useful structures, devices, elements, arrangements, parts and combinations are set forth in the appended claims.

I claim:

1. Free vortex aircraft construction including
   a frame means;
   b shield means mounted on the frame means to generate and shed a substantial amount of vorticity into the air when the aircraft moves forwardly through the air;
   c the shield means and frame means providing a vortex forming zone downwind of the shield means;
   d a plurality of engine means mounted on the frame means to provide thrust for moving the aircraft forwardly through the air, and for pumping air from spaced locations in the vortex forming zone to retain and concentrate the vorticity within said zone to form a free vortex of low pressure air extending in an arcuate manner across the frame means; and
   e surface means on the frame means located beneath at least a portion of the spaced pumping locations, on which the free vortex acts to produce lift on said aircraft.

2. The construction defined in claim 1 in which the shield means has a sharp top edge to increase the vorticity shed by the shield means into the vortex forming zone.

3. The construction defined in claim 1 in which the surface means includes additional portions located rearwardly of the shield means; and in which said additional portions extend generally throughout the length of the vortex forming zone and beneath the free vortex.

4. The construction defined in claim 1 in which the shield means includes a generally vertically extending shield member; in which said shield member extends between certain of the engine means; and in which said shield member terminates in a sharp top edge.

5. The construction defined in claim 1 in which the frame means includes a generally flat horizontal base; in which said base is located rearwardly of the shield means; and in which said base extends between certain of the engine means.

6. The construction defined in claim 5 in which the base and shield means forms a cavity-like region downwind of the shield means and upwind of the free vortex; and in which said certain of the engine means are mounted on the frame means adjacent said cavity-like region and are adapted to withdraw air from the cavity-like region to hold the vortex tightly onto the aircraft within the vortex forming zone.

7. The construction defined in claim 1 in which vortex augmentor means is mounted on the frame means; and in which said augmentor means increase the flow of air into the vortex forming zone and the resulting free vortex formed by the shield means and engine means.

8. The construction defined in claim 7 in which the vortex augmentor is located downwind of the vortex forming zone.

9. The construction defined in claim 7 in which the vortex augmentor means includes a power driven propeller mounted on a generally vertically extending shaft; and in which said augmentor means is located generally intermediate certain of the engine means and rearwardly of the vortex forming zone.

10. The construction defined in claim 1 in which the engine means includes a pair of thruster engine assemblies; in which said thruster engine assemblies each include a cylindrical housing open at both ends; in which engine driven propeller means is mounted within each of said housings; in which opening means is provided in each of the cylindrical housings adjacent the vortex forming zone; and in which the propeller means provides both the forward thrust for the aircraft and pumps air from the vortex forming zone through the housing opening means.

11. The construction defined in claim 1 in which the engine means includes thruster engine means for moving the aircraft forwardly through the air, and spaced pumping engine means for pumping air from the vortex forming zone.

12. The construction defined in claim 11 in which the pumping engine means includes a pair of engine driven bladed discs, rotatably mounted on the frame means at an inclined position adjacent the ends of the vortex forming zone.

13. Aircraft construction including:
   a frame means having a generally horizontal base;
   b a pair of spaced thruster assemblies mounted on the frame means for providing forward thrust and movement of the aircraft through the air;
   c shield means mounted on the frame means forwardly of the base and extending upwardly with respect to the base, said shield means being adapted to generate and shed vorticity into the air as the aircraft moves forwardly through the air;
   d the shield means and base forming a vortex forming zone extending transversely between the thruster assemblies;
   e each thruster assembly including a cylindrical housing open at both ends, and engine means mounted within the housing for drawing air through said housing for moving the aircraft forwardly through the air;

f. opening means formed in each of the cylindrical housings and communicating with the vortex forming zone;

g. the thruster assembly engine means also being adapted to pump air from the vortex forming zone through the opening means to retain, concentrate and form the vorticity within said zone into a strong free vortex which extends in an arcuate manner between said opening means; and h. the base providing a surface which extends beneath at least a portion of the formed vortex, on which the vortex acts to produce lift on the aircraft.

14. The construction defined in claim 13 in which the thruster engine means is an engine driven propeller having generally vertically extending blades; and in which the propeller blades are located rearwardly of the cylindrical housing opening means.

15. The construction defined in claim 14 in which the thruster engine means includes choke means mounted on the cylindrical housings to block a portion of the airflow through the front open end of said housings.

16. The construction defined in claim 13 in which the shield means has a sharp top edge to increase the vorticity shed by the shield means into the vortex forming zone.

17. The construction defined in claim 13 in which vortex augmentor means is mounted on the frame means to increase the flow of air into the vortex forming zone; in which the augmentor means includes an engine driven propeller, said propeller being adapted to be rotated in a generally horizontal plane; and in which the propeller is located generally rearwardly of the vortex forming zone and intermediate the thruster assemblies.

18. The construction defined in claim 13 in which the shield means includes a rearwardly curved, rearwardly sloping member and a vertically extending, arcuate-shaped upper section; and in which said upper section terminates in a sharp top edge.

19. The construction defined in claim 13 in which fin means is mounted on top of each of the cylindrical housings of the thruster assemblies; and in which said fin means block a portion of the surrounding air from entering the vortex forming zone to enable a stronger vortex to be created.

20. Aircraft construction including:
a. frame means;
b. thruster engine means mounted on the frame means for providing forward thrust and movement to the aircraft;
c. shield means mounted on the frame means, said shield means being adapted to generate and shed a substantial amount of vorticity as the aircraft moves through the air into a vortex forming zone formed in the downwind side of the shield means;
d. a pair of spaced air pumping means mounted on the frame means to pump air from the vortex forming zone to form, concentrate and retain a free vortex within said zone with said vortex extending in an arcuate manner between the pumping means;
e. the pumping means each including an engine driven disc having blade means mounted on the disc, said disc being rotatably mounted on the frame means downwind of the shield means and adjacent the vortex forming zone with the discs being mounted at downwardly inwardly extending positions, and with the vortex extending from one disc to the other; and
f. the disc providing surface means on which the vortex acts to produce lift on the aircraft.

21. The construction defined in claim 20 in which the thruster engine means includes a pair of propeller driven engines, each of which is mounted adjacent to and outboard of one of the blade disc air pumping means.

22. The construction defined in claim 20 in which the frame means includes a generally horizontal base extending between the pair of bladed discs and rearwardly of the shield means; and in which the base provides additional surface means on which the vortex acts to produce lift on the aircraft.

23. The construction defined in claim 22 in which baffle means is mounted on the base; and in which the baffle is mounted in spaced relationship above the base and forms an air passage open at both ends and sides between the base and baffle means to assist in increasing the airflow into the vortex forming zone.

24. The construction defined in claim 22 in which the base terminates in a sharp trailing edge to assist in reducing drag on the aircraft.

25. The construction defined in claim 20 in which the frame means includes a front nose section having a generally flat bottom wall and an upwardly, rearwardly extending top wall; and in which said top wall forms a portion of the shield means.

26. The construction defined in claim 25 in which the shield means further includes a concavely curved shield wall portion.

* * * * *